(12) United States Patent
Huang

(10) Patent No.: US 11,600,223 B2
(45) Date of Patent: Mar. 7, 2023

(54) WEARABLE DISPLAY APPARATUS AND DRIVING METHOD THEREOF

(71) Applicant: SeeYA Optronics Co., Ltd., Shanghai (CN)

(72) Inventor: Zhongshou Huang, Shanghai (CN)

(73) Assignee: SeeYA Optronics Co., Ltd., Shanghai (CN)

( * ) Notice: Subject to any disclaimer, the term of this patent is extended or adjusted under 35 U.S.C. 154(b) by 0 days.

(21) Appl. No.: 17/470,882

(22) Filed: Sep. 9, 2021

(65) Prior Publication Data
US 2023/0011656 A1 Jan. 12, 2023

(30) Foreign Application Priority Data
Jul. 7, 2021 (CN) .......................... 202110767120.4

(51) Int. Cl.
G09G 3/3208 (2016.01)
G02B 27/01 (2006.01)
F21V 8/00 (2006.01)

(52) U.S. Cl.
CPC .......... *G09G 3/3208* (2013.01); *G02B 6/005* (2013.01); *G02B 6/0026* (2013.01); *G02B 27/0172* (2013.01); *G02B 2027/012* (2013.01); *G09G 2320/0242* (2013.01); *G09G 2360/145* (2013.01)

(58) Field of Classification Search
CPC ............ G02B 27/0093; G02B 27/0172; G02B 2027/014; G02B 2027/0174
See application file for complete search history.

(56) References Cited

U.S. PATENT DOCUMENTS

| | | | |
|---|---|---|---|
| 10,962,787 B1 * | 3/2021 | Lou .................... | G02B 6/0016 |
| 2018/0008141 A1 * | 1/2018 | Krueger .................. | A61B 3/14 |
| 2022/0050522 A1 * | 2/2022 | Krukowski ............. | G06F 3/011 |

* cited by examiner

*Primary Examiner* — Nelson M Rosario
(74) *Attorney, Agent, or Firm* — Kolitch Romano Dascenzo Gates LLC

(57) ABSTRACT

A wearable display apparatus comprises a control unit, a display unit, an optical transmission unit and a photoelectric detection unit. The control unit is configured to control the display unit to output a display image, the light transmission unit is configured to transmit a first part of light of the display image to human eyes, and transmit a second part of the light of the display image to the photoelectric detection unit, the photoelectric detection unit is configured to send a feedback signal to the control unit; and the control unit is configured to compensate for a drift of characteristics including brightness and color according to the feedback signal from the photoelectric detection unit.

11 Claims, 13 Drawing Sheets

WEARABLE DISPLAY APPARATUS AND DRIVING METHOD THEREOF

CROSS-REFERENCE TO RELATED APPLICATION

This application claims priority to Chinese Patent Application No. 202110767120.4, filed on Jul. 7, 2021, the entire contents of which are incorporated herein by reference.

TECHNICAL FIELD

The present disclosure relates to display technology, and more particularly to a wearable display apparatus and a driving method thereof.

BACKGROUND

With rapid development of OLED (Organic Light-Emitting Diode) display technology and expansion of capability of manufacturing large-size display, OLED display apparatuses have become popular. OLED display apparatuses also occupy a considerable market share of medium-sized display apparatuses and even large-size TV display apparatuses. When OLED display technology is applied to some special application fields, such as microdisplay apparatuses in Augmented Reality (AR) or Virtual Reality (VR) glasses, the OLED display apparatuses need to be wearable and thus need to be considerably compact and light weight. Nowadays, miniaturization of OLED microdisplay apparatuses has become an inevitable trend in development of wearable AR/VR glasses.

To acquire a similar light intensity as in a larger display apparatus, a display apparatus in a smaller size needs to have greater brightness than the larger display apparatus. In definition, the light intensity means light flux per unit solid angle, and the brightness means light intensity per unit area. High brightness generated by a miniaturized display apparatus, such as an 0.5"×0.5" OLED chip mounted in a glass, will be associated with a problem of heat dissipation. Moreover, recent development pursuing high image resolution more than 4K, and high frame frequency more than 60 Hz, has been making the heat dissipation problem in OLED microdisplay even worse due to extended working hours under high temperature stress.

Under high-temperature stress for long working hours, some light-emitting materials, especially organic light-emitting materials, will be suffered by some serious problems such as decay of light-emitting efficiency, color drift, residual image, or potential permanent screen burning. Even at room temperature, organic molecules are gradually getting aged and losing luminescent activity, and continuous high-temperature stress for long working hours will accelerate the aging process of the organic material. The aging decreases the light-emitting efficiency of the OLED display apparatus, or in other words, increases power consumption to keep a same brightness as before. Further, as OLED microdisplay usually employs white OLED and color filters to create different colors, the color shift may occur due to different usage histories in different color pixels, for instance the duration of illumination and light intensity. As time goes by, color shift will show up and needs be addressed accordingly.

SUMMARY

In a first aspect of the present disclosure, a wearable display apparatus is provided, including: a control unit; a display unit including a plurality of light-emitting elements and electrically connected to the control unit; a light transmission unit; and a photoelectric detection unit electrically connected to the control unit. The control unit is configured to control the display unit to output a display image; the light transmission unit is configured to transmit a first part of light of the display image to human eyes, and transmit a second part of the light of the display image to the photoelectric detection unit; the photoelectric detection unit is configured to send a feedback signal to the control unit after detecting the second part of the light; and the control unit is configured to compensate for drift of characteristics including brightness and color according to the feedback signal from the photoelectric detection unit.

In a second aspect of the present disclosure, a driving method of a wearable display apparatus is provided, and the wearable display apparatus includes: a control unit; a display unit including a plurality of light-emitting elements and electrically connected to the control unit; a light transmission unit; and a photoelectric detection unit electrically connected to the control unit. The driving method includes the following steps:

controlling, by the control unit, the display unit to output a display image, according to initial settings;

acquiring, by the photoelectric detection unit, image information of the display image at set time intervals, and sending, by the photoelectric detection unit, a feedback signal including the image information to the control unit; and comparing, by the control unit, the feedback signal from the photoelectric detection unit and an initial signal of the photoelectric detection unit, calculating, by the control unit, a drift amount of characteristics including brightness and color, and compensating, by the control unit, for the drift of following display images when the drift amount is greater than a preset threshold.

It should be readily understood that both the aforementioned general description and the following detailed description are exemplary and explanatory only, and are not intended as a limitation to the scope of the present disclosure.

BRIEF DESCRIPTION OF THE DRAWINGS

The aforementioned and other features, and advantages of the invention are apparent from the following detailed description taken in conjunction with the accompanying drawings in which.

DETAILED DESCRIPTION

In the following, embodiments of the present disclosure will be described in detail with reference to the figures. The concept of the present disclosure can be implemented in a plurality of forms, and should not be limited to the embodiments described hereafter. On the contrary, these embodiments are provided to make the present disclosure more comprehensive and understandable, and so the conception of the embodiments can be entirely conveyed to those skilled in the art. Same reference signs in the figures refer to same or similar elements, so repeated descriptions of them will be omitted.

Besides, the technical features, assemblies, and characteristics can be combined in any appropriate way in one or more embodiments. In the following, more specific details are provided to give a full understanding of the embodiments of the present disclosure. However, those skilled in the art should realize that the technical proposal can also be realized without one or more of the specific details, or with other assemblies or components. In other conditions, some common assemblies or components well known in the art are not described to avoid making the present disclosure unclear.

In the embodiments of the present disclosure, the terminologies are only used for describing the special embodiments, and are not intended to be a limitation to the present disclosure. For example, when a member is described as being formed on or under another member, the member can be directly formed on or under another member, or the member can be indirectly formed, through an intermediate member, on or under another member. The ordinal numbers "first", "second", etc., are only used for distinguishing between different components, and are not intended to represent sequence, number, or significance. For those skilled in the art, the specific meanings of the above terminologies can be understood according to specific situations.

Figure 1:
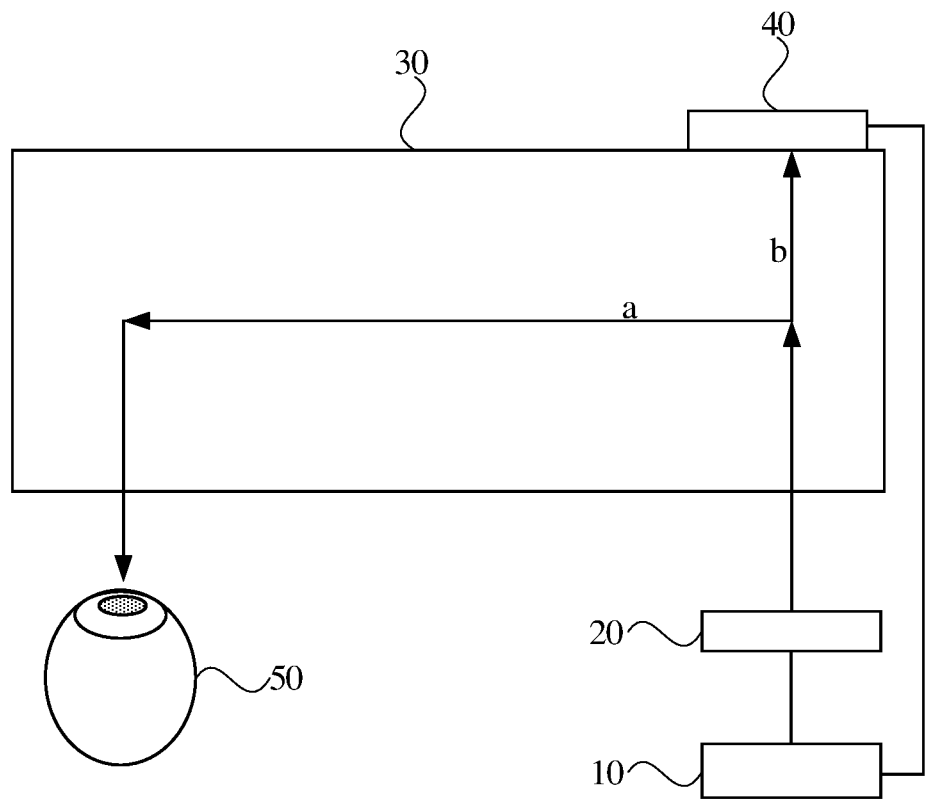
FIG. 1 is a structural schematic diagram of a wearable display apparatus according to an embodiment of the present disclosure.

FIG. 1 is a structural schematic diagram of a wearable display apparatus according to an embodiment of the present disclosure. As shown in FIG. 1, the wearable display apparatus includes a control unit 10, a display unit 20, a light transmission unit 30, and a photoelectric detection unit 40. The control unit 10 is electrically connected to the display unit 20, the display unit 20 includes a plurality of light-emitting elements (not shown in FIG. 1). The control unit 10 is configured to control the display unit 20 to output a display image. The light transmission unit 30 is configured to transmit a first part of light of the display image to human eyes 50, and transmit a second part of light of the display image to the photoelectric detection unit 40. The first part of light is denoted by "a", and the second part of light is denoted by "b" in FIG. 1. The photoelectric detection unit 40 is configured to send a feedback signal to the control unit 10 after detecting the second part of the light. The control unit 10 is configured to compensate for drift of characteristics including brightness and color according to the feedback signal from the photoelectric detection unit 40.

In the embodiment, the wearable display apparatus may be an AR or VR display apparatus. The control unit 10 includes an image processing chip configured to control the display unit 20 to output the display image, either a static picture or a video image, according to a preset program. The control unit 10, the display unit 20, the light transmission unit 30, and the photoelectric detection unit 40 can be integrated in an equipment, such as a helmet. The light-emitting unit may be an organic light-emitting diode (OLED) driven by a silicon-based backplane for the purpose of miniaturization, wherein pixel driving circuits, scan lines, data lines, and external power lines are all integrated in a silicon chip, and an OLED light-emitting film is deposited on the silicon chip by thin-film evaporation or other methods. The light transmission unit 30 is configured to define the optical path. The light transmission unit 30 includes at least one reflector and at least one transmission channel. The light transmission unit 30 is configured to transmit the first part of the light to the human eyes 50, and the second part b of the light to the photoelectric detection unit 40 to detect the optical characteristics of the display image. The photoelectric detection unit 40 includes a plurality of photoelectric sensors, and configured to receive the second part of the light and convert received light signal to electronic signal, from which information on the decay of light brightness and deviation of color can be derived. The control unit 10 then calibrates the driving signal according to the feedback signal from the photoelectric detection unit 40 to compensate for the drift of characteristics including brightness and color in the subsequent display images.

The first part a of light and the second part b of light in FIG. 1 schematically illustrate the two parts of the light emitted from the display unit 10 and transmitted to the human eyes 50 and the photoelectric unit 40, and are not intended to indicate actual optical transmission path.

In the embodiment, the control unit controls the display unit to output the display image. The first part of the light of the display image is transmitted to the human eyes through the light transmission unit, so that the human eyes get the display image. The second part of the light of the display image is transmitted to the photoelectrical detection unit which detects the brightness and color distributions, and the detected information are then sent back to the control unit. The control unit compensates for the drift of characteristics including brightness and color for the subsequent display images according to the feedback signal from the photoelectrical detection unit. Therefore, the lifetime of the wearable display apparatus is extended, the user perceived display performances are kept substantially unchanged and thus improve the user experience.

Figure 2:
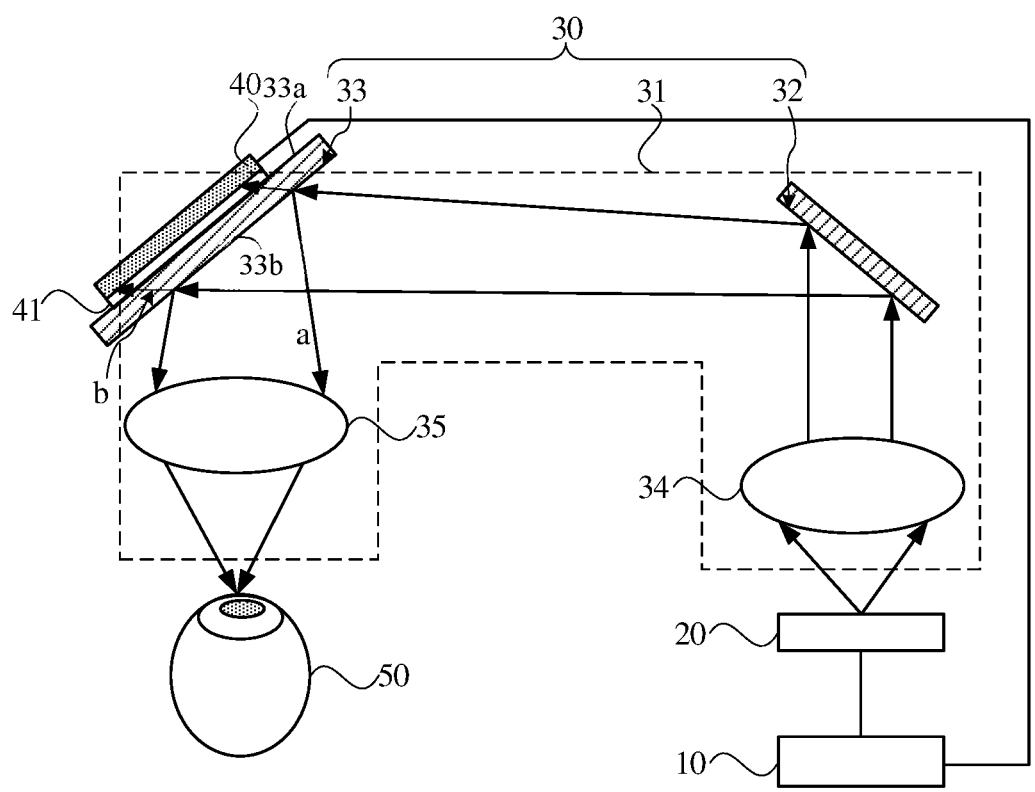
FIG. 2 is a structural schematic diagram of another wearable display apparatus according to an embodiment of the present disclosure.

FIG. 2 is a structural schematic diagram of another wearable display apparatus according to an embodiment of the present disclosure. As shown in FIG. 2, the light transmission unit 30 includes: a transmission channel 31; a first reflector 32 configured to receive the display image from the display unit 20 and reflect the display image to the transmission channel 31; and a second reflector 33 configured to receive the light from the first reflector 32 and reflect the first part of the light to the human eyes 50, and transmit a second part of the light to the photoelectric detection unit 40. The first reflector 32 is located at a position to receive the display image from the display unit 20. The second reflector 33 is located at a position to receive the display image reflected from the first reflector 32 and reflect a first part of the light a to the human eyes 50. The second reflector 33 has a reflecting side 33b and a first side 33a opposite to the reflecting side 33b. The photoelectric detection unit 40 is located on the first side 33*a* of the second reflector 33 and away from the human eyes 50. The reflectivity of the second reflector 33 is preferred to be in a range from 50% to 99%. In some embodiments, the range of 50% to 99% of the reflectivity includes the reflectivity of 50% and 99%. The second reflector 33 is configured such that sufficient light (e.g., the second part b of the light of the display image) penetrates the second reflector 33 to irradiate the photoelectric detection unit 40 and transmit a feedback signal to the control unit 10.

In some embodiments, the first reflector 32 and the second reflector 33 are both planar mirrors. In other embodiments, a prism can be used for the first and the second reflectors. In some embodiments, the reflective surfaces, either on the planar mirror or in a prism, are actually a transflective surface. In one example, if the reflectivity of the second reflector 33 is 95%, 95% of the incident light is reflected and the rest 5% will penetrate through the reflective surface.

In an embodiment, the photoelectric detection unit 40 can be directly laminated on the second reflector 33 on the first side 33*a*. In another embodiment as shown in FIG. 2, the photoelectric detection unit 40 is stacked on the second reflector 33 via a transparent interlayer: a first transparent dielectric layer 41. That is, a transparent dielectric layer 41 is disposed on the first side 33*a* of the second reflector 33 and the photoelectric detection unit 40 is disposed on a surface of the transparent dielectric layer 41. The first transparent dielectric layer 41 has a refractive index between that of the second reflector 33 and that of the photoelectric detection unit 40.

During use, the photoelectric detection unit 40 acquires image information of characteristics including brightness and color from incident light at set time intervals, and sends an electronic signal including the image information to the control unit 10 via a signal line. The control unit 10 compares factory setting data of the wearable display apparatus and the data in the electronic signal from the photoelectric detection unit 40 to acquire information on the brightness decay and the color deviation of the display unit 20. Then based on the decay curve of the brightness of the display unit 20, the changes of a brightness decay process and a color change process of the display unit 20 overtime can be predicted. Therefore, appropriate overcompensation or other kinds of operation can be applied during the compensation process.

According to the information on the brightness decay and color change, the control unit 10 modifies the image signal by adding a compensation signal component to the original image signal to be sent to the display unit 20. The modification may be simple addition and subtraction, or more complex non-linear modification, which can be selected according to actual situations and requirements. Therefore, after the updated image electronic signal is input to the display unit 20, the display image output will be restored to the state before the brightness decay or color deviation.

Figure 3:
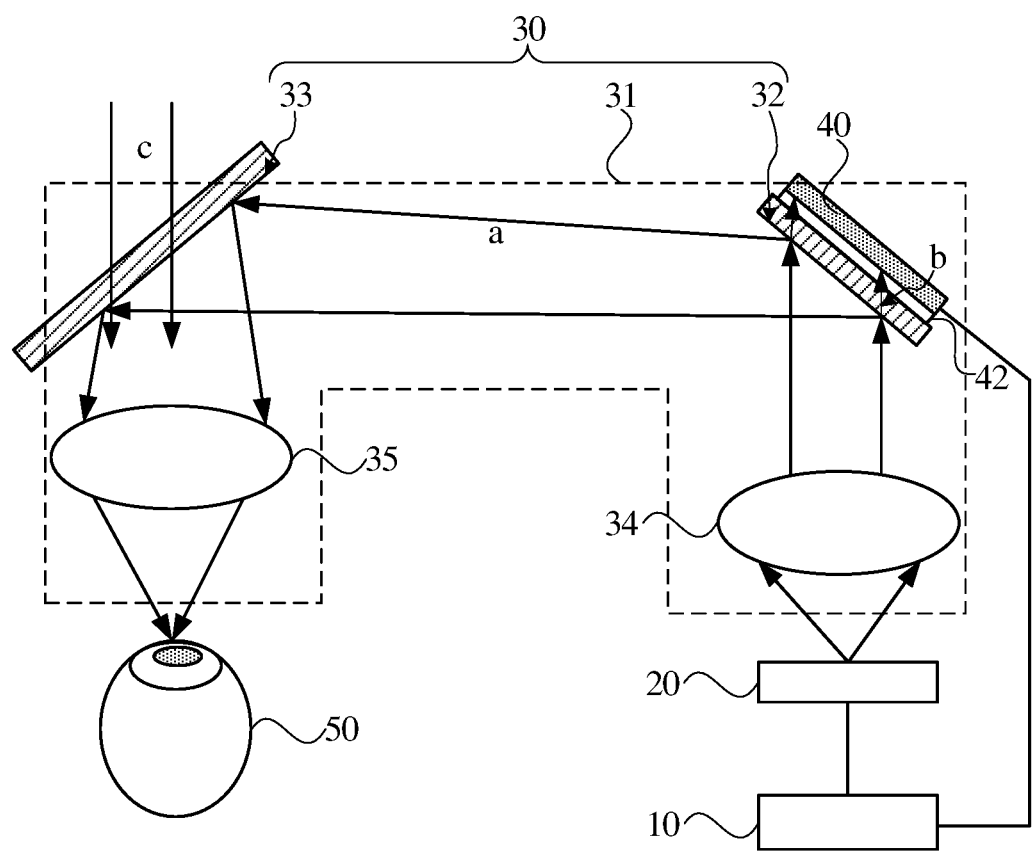
FIG. 3 is a structural schematic diagram of another wearable display apparatus according to an embodiment of the present disclosure.

FIG. 3 is a structural schematic diagram of another wearable display apparatus according to an embodiment of the present disclosure. As shown in FIG. 3, the light transmission unit 30 includes: a transmission channel 31; a first reflector 32 configured to receive the display image from the display unit 20 and reflect the first part of the light of the display image to the transmission channel, and allow the second part of the light of the display image penetrates the first reflector 32 to irradiate the photoelectric detection unit 40, and a second reflector 33 configured to receive the light reflected from the first reflector 32 and reflect light from the transmission channel to the human eyes 50. The photoelectric detection unit 40 is located at a first side of the first reflector 32 and away from the display unit 20. The first side is opposite to a reflecting side of the first reflector 32. A reflectivity of the first reflector is preferred to be in a range from 50% to 99%.

The difference between the embodiment in FIG. 3 and the embodiment in FIG. 2 is that the first reflector 32 is a reflection mirror that is partially reflective and partially transparent. In an embodiment, the photoelectric detection unit 40 is directly laminated on a first side of the first reflector 32 and away from the display unit 20, and the first side is opposite to a reflecting side of the first reflector 32. In another embodiment shown in FIG. 3, the first reflector 32 is stacked on the first side of the first reflector 32 via a transparent interlayer: a second transparent dielectric layer 42. A refractive index of the second transparent dielectric layer 42 is between that of the first reflector 32 and that of the photoelectric detection unit 40 to increase efficiency of light reaching the photoelectric detection unit 40.

In the embodiment shown in FIG. 2, the photoelectric detection unit 40 is located at the first side of the second reflector 33 and the second reflector 33 is configured to reflect/transmit the first part of light to the human eyes 50. Therefore, the embodiment shown in FIG. 2 can be used as a VR display apparatus, and the human eyes 50 can only observe the image displayed by the display unit 20. In the embodiment shown in FIG. 3, the photoelectric detection unit 40 is not located in the visual range of the human eyes 50 and the second reflector 33 is partially transparent, external light c can be transmitted to human eyes 50 by passing through the second reflector 33. Therefore, external real image can be overlaid on the optical image of the display unit 20 to form an augmented reality image. For example, a name of a scene can be overlaid on a real-time observed scene, or a name, background information, or an infrared image of a character can be overlaid on a real-time observed character. Therefore, the embodiment shown in FIG. 3 can be used as an AR display apparatus. When the external image is blocked from inputting, with an electrical valve or a manually operated piece that is black or lightproof, the wearable display apparatus becomes a VR display apparatus, with which the human eyes 50 can only observe the optical image output from the display unit 20.

In the embodiment shown in FIG. 2 or the embodiment shown in FIG. 3, the light transmission unit 30 further includes a focusing lens 34 located between the display unit 20 and the first reflector 32 and an eyepiece 35 located between the second reflector 33 and human eyes 50.

The focusing lens 34 is configured to collimate the light output from the display unit 20. The eyepiece 35 is configured to collect the light reflected or transmitted by the second reflector 33 to human eyes 50. In an embodiment, the focusing lens 34 and the eyepiece 35 can use a lens group including a plurality of lenses to improve imaging effect. The composition of the focusing lens 34 and the eyepiece 35 can be designed according to actual requirements.

Figure 4:
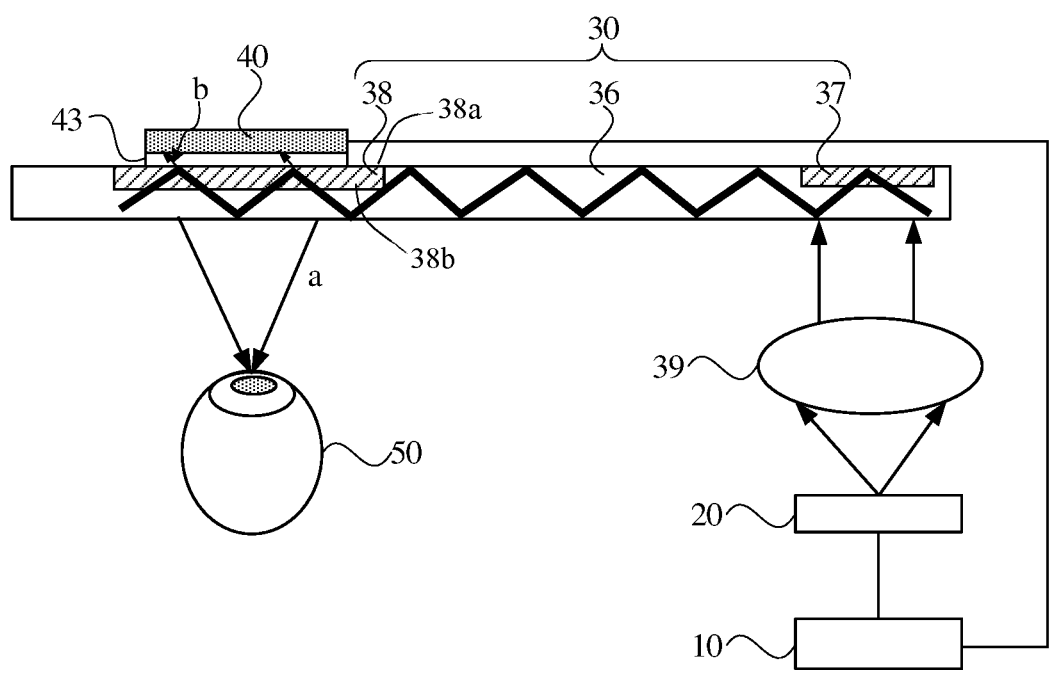
FIG. 4 is a structural schematic diagram of another wearable display apparatus according to an embodiment of the present disclosure.

FIG. 4 is a structural schematic diagram of another wearable display apparatus according to an embodiment of the present disclosure. The light transmission unit 40 includes: at least one optical waveguide 36 configured to transmit optical images; a diffractive input-coupler 37 configured to couple the display image to the optical waveguide 36; a diffractive output-coupler 38 configured to output the first part of the light to the human eyes 50, and output the second part of the light to the photoelectric detection unit 40. The photoelectric detection unit 40 is located at a first side 38*a* of the diffractive output-coupler 38 and away from the human eyes 50, and the first side 38*a* is opposite to a second side 38*b* that faces the human eyes 50. FIG. 4 shows an embodiment with one optical waveguide 36. In other embodiments, the light transmission unit 40 may include more than one optical waveguide 36.

Continuing with FIG. 4, the diffractive input-coupler 37 is located at an incident window of the optical waveguide 36, and the diffractive output-coupler 38 is located at an output window of the optical waveguide 36. In an embodiment, the diffractive input-coupler 37 includes surface relief gratings (SRG) or volume holographic gratings (VHG), and the diffractive output-coupler 38 includes surface relief gratings (SRG) or volume holographic gratings (VHG). The optical waveguides 36 including this kind of plane-like diffractive gratings is also called diffractive waveguides 36, and is different from geometrical optical waveguide which is based on total reflection principle of optical dense medium and optical sparse medium interface. Under the function of the diffractive input-coupler, the light carrying the display image is continuously and totally reflected at two side interfaces of the diffractive waveguides 36 to be transmitted forward with a transmission angle greater than a total reflection angle. Finally, the light reaches a diffractive output-coupler 38, and the horizontally input light is projected to retina of the human eyes. In another embodiment, three waveguides are used to transmit light of different colors to decrease rainbow effect (i.e., the effect that red light, blue light, and green light are separated because they have different refractive index values in a transparent material).

In the embodiment, a part of the light can pass through the diffractive output-coupler 38 to be received by the photoelectric detection unit 40. For example, when the diffractive output-coupler 38 includes SRG, its structure is a plurality of convex-concave portions distributed with a fixed interval which cover a surface of the optical waveguide 36. The interval between two adjacent convex-concave portions is smaller than an optical wavelength. The horizontally input light is diffracted several times on the diffractive output-coupler 38, so that the reflective diffractive light is projected to human eyes, and the transmissive diffractive light is projected to the photoelectrical detection unit 40. Various intensity ratios between the reflective diffractive light and the transmissive diffractive light can be realized by adjusting the structure of the diffractive output-coupler 38, for example, adjusting a convex-concave depth on the surface, a tilt angle of the convex portions, a length of the interval of convex-concave portions, a duty circle, or an arrangement angle of the gratings on the surface of the optical waveguide. The photoelectrical detection unit 40 may be a semiconductor sensor with high sensitivity, for example, a silicon photodiode or a silicon CMOS image sensor. The photoelectrical detection unit 40 can acquire enough information from only 1% to 10% of the horizontally transmitted input light, and enable the calculation the output light intensity and color of the display unit 20. Therefore, most light is transmitted to the human eyes 50, while sufficient light is transmitted and detected by the photoelectrical detection unit 40 to provide the light information.

As shown in FIG. 4, in the illustrated embodiment, the photoelectric detection unit 40 is stacked on the first side 38*a* of the diffractive output-coupler 38 via a transparent interlayer: a third transparent dielectric layer 43. A refractive index of the third transparent dielectric layer 43 is between that of the diffractive output-coupler 38 and that of the photoelectric detection unit 40. In an embodiment, the third transparent dielectric layer 43 may be a resin film. This configuration would hardly affect a diffractive effect of light in the diffractive gratings, and also is beneficial for transmitting the second part of the light to the photoelectric detection unit 40.

Figure 5:
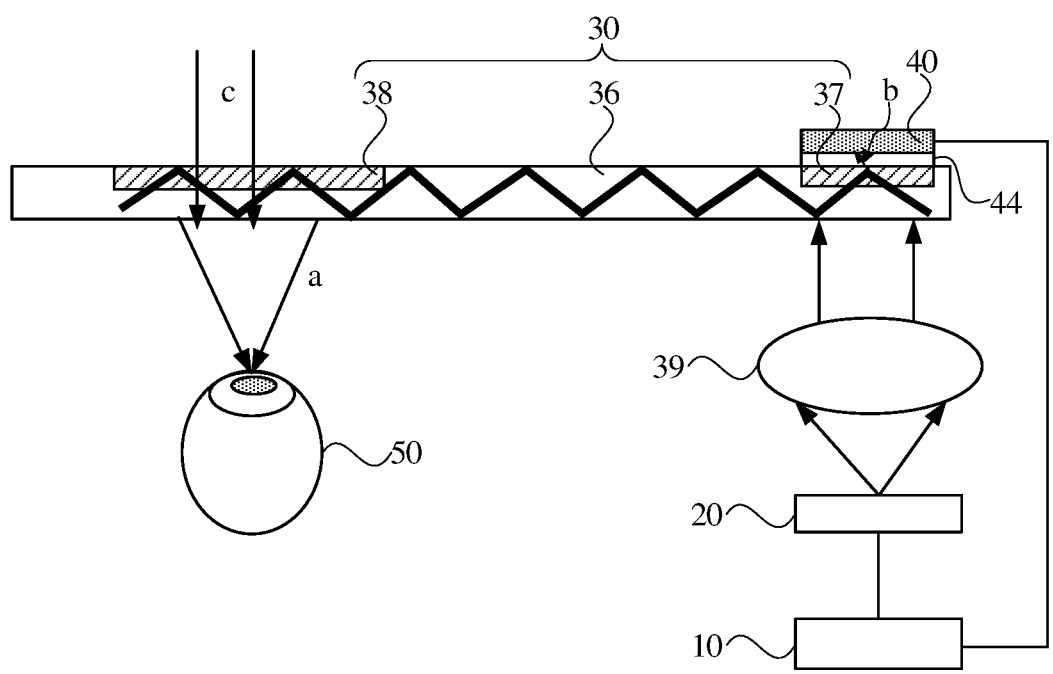
FIG. 5 is a structural schematic diagram of another wearable display apparatus according to an embodiment of the present disclosure.

FIG. 5 is a structural schematic diagram of another wearable display apparatus according to an embodiment of the present disclosure. The light transmission unit 30 includes: at least one optical waveguide 36 configured to transmit optical images; a diffractive input-coupler 37 configured to couple the first part of light of the display image to the optical waveguide 36, and output the second part of the light of the display image to the photoelectric detection unit 40; a diffractive output-coupler 38 configured to output the first part of the light 36 to human eyes 50. The photoelectric detection unit 40 is located at a first side of the diffractive input-coupler 37 and away from the display unit 20. The first side is opposite to a second side that faces the display unit 20.

Different from the embodiment shown in FIG. 4, in the embodiment shown in FIG. 5, the photoelectric detection unit 40 is located at the diffractive input-coupler 37 and the diffractive input-coupler 37 is on a light path of the image from the display unit 20, and a part of the output light of the diffractive input-coupler 37 is projected to the photoelectric detection unit 40. The other details in the embodiment in FIG. 5 are similar to those in the embodiment in FIG. 4. In the embodiment in FIG. 4, the display apparatus can be used as a VR display apparatus because the photoelectric detection unit 40 is located at a side of the diffractive output-coupler 38, and the human eyes 50 can only observe the image displayed on the display unit 20. In the embodiment in FIG. 5, the display apparatus can be used as an AR display apparatus because the diffractive output-coupler 38 is capable of outputting external light c to the human eyes 50. When the external image is blocked from inputting, with an electrical valve or a manually operated piece that is black or lightproof, the wearable display apparatus becomes a VR display apparatus, with which the human eyes 50 can only observe the optical image output from the display unit 20.

Similar to the embodiment shown in FIG. 4, in the embodiment shown in FIG. 5, the photoelectric detection unit 40 is stacked on a first side of the diffractive input-coupler 37 via a transparent interlayer: a fourth transparent dielectric layer 44. The first side of the diffractive input-coupler 37 is opposite to a second side of the diffractive input-coupler 37 and the second side faces the display unit 20. A refractive index of the fourth transparent dielectric layer 44 is between that of the diffractive input-coupler 37 and that of the photoelectric detection unit 40. The refractive index of the fourth transparent dielectric layer 44 can be designed according to actual requirements.

In the embodiment in FIG. 4 or FIG. 5, the light transmission unit 30 further includes a focusing lens 39 located between the display unit 20 and the diffractive input-coupler 37.

The focusing lens 39 is configured to collimate the light output from the display unit 20. The focusing lens 39 may include a lens group including a plurality of lenses to improve imaging effect. The composition of the focusing lens 39 can be designed according to actual requirements.

In the embodiments of the present disclosure, the type of the photoelectric sensor of the photoelectric detection unit 40 can be selected according to actual requirements. In some embodiments, the photoelectric detection unit 40 includes at least one black-white photoelectric sensor configured to detect light flux, and at least one multispectral photoelectric sensor or color image sensor configured to sense different color spectrum.

The black-white photoelectric sensor only detects light intensity without distinguishing colors of the light, and can be used to measure the brightness. The color image sensor may be a CMOS sensor or a CCD sensor. A multispectral photoelectric sensor or image sensor can be used to detect color deviation.

In some embodiments, the photoelectric detection unit 40 includes at least one multispectral photoelectric sensor or color image sensor. The photoelectric detection unit 40 includes three detection regions configured to detect red, green, and blue light.

Figure 6:
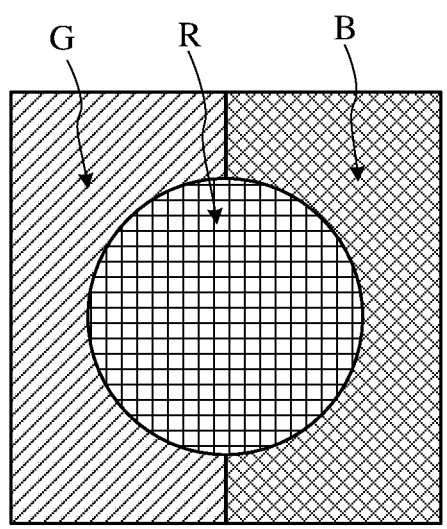
FIGS. 6-8 are schematic diagrams of a plane structure of a photoelectric detection unit according to the embodiments of the present disclosure.
Figure 7:
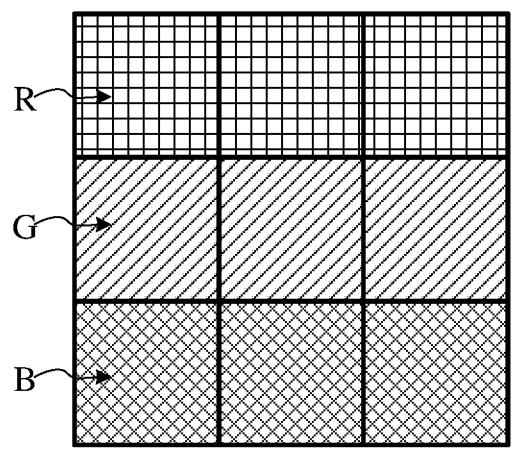
Figure 8:
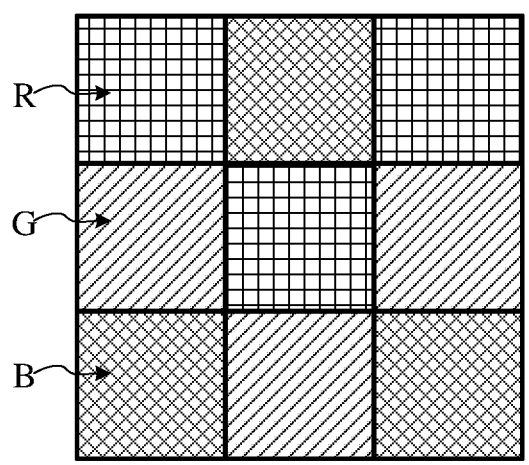

FIGS. 6-8 are schematic diagrams of a planar structure of a photoelectric detection unit according to some embodiments of the present disclosure. As shown in FIGS. 6-8, the photoelectric detection unit 40 includes a red detection region R configured to detect red light, a green detection region G configured to detect green light and a blue detection region B configured to detect blue light. FIGS. 6-8 illustrates that the red detection region R, the green detection region G and the blue detection region B are arranged in different locations. It will be understood that the configurations of the red detection region R, the green detection region G and the blue detection region B are not limited to the illustrated embodiments.

In one embodiment, the detection regions of a same color may be connected to the control unit via a signal bus. In another embodiment, each detection region is connected to the control unit via an independent signal line. In another embodiment, all the detection regions are connected to the control unit after being scanned sequentially and passing through a first pre-processing unit.

Figure 9:
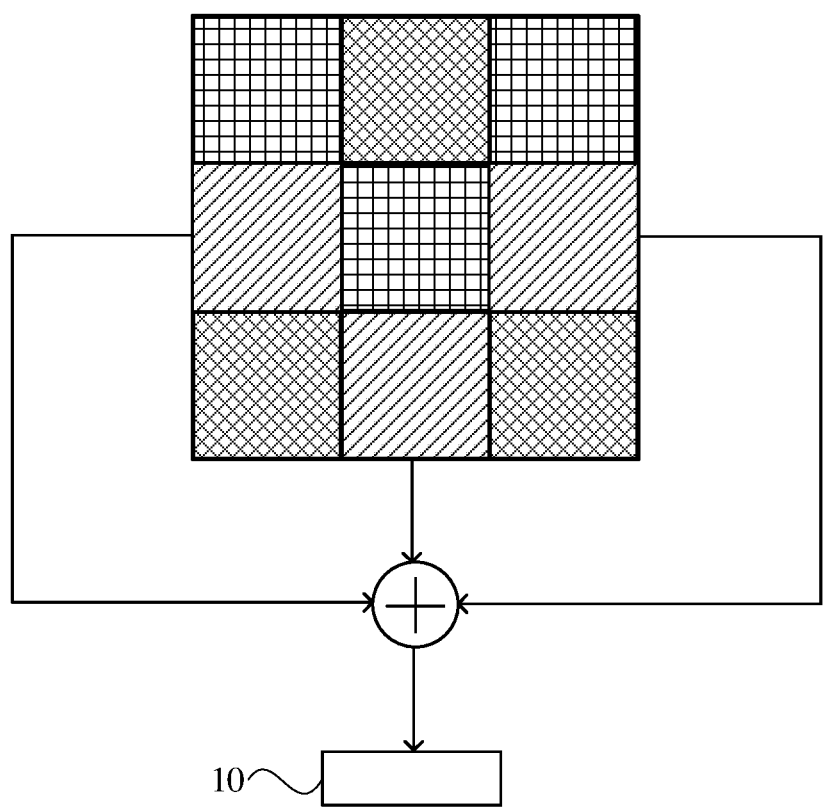
FIGS. 9-11 are schematic diagrams of connection schemes of a photoelectric detection unit according to the embodiments of the present disclosure.
Figure 10:
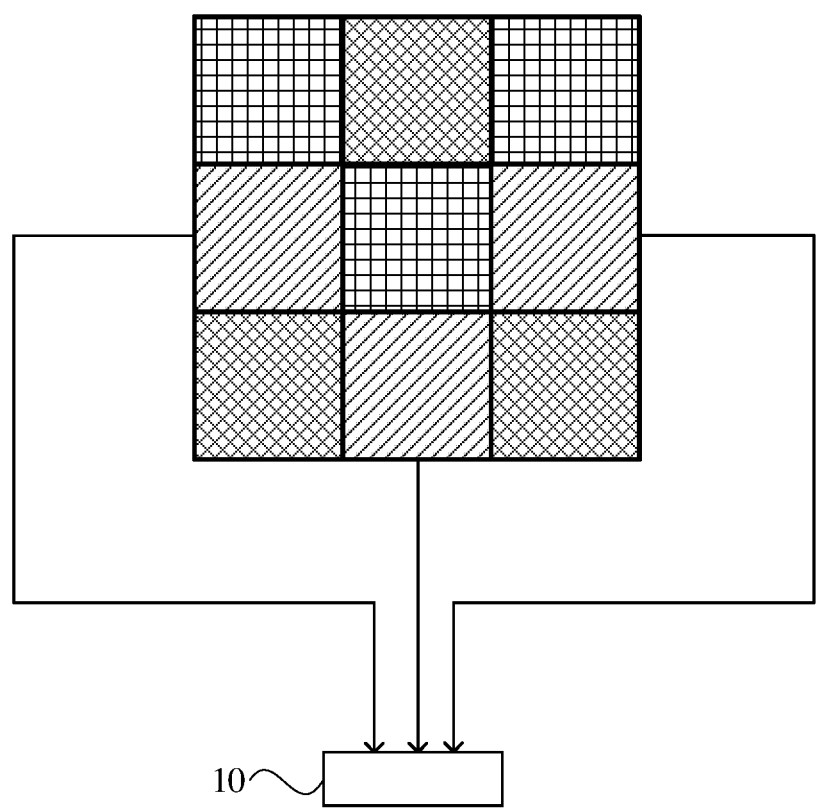
Figure 11:
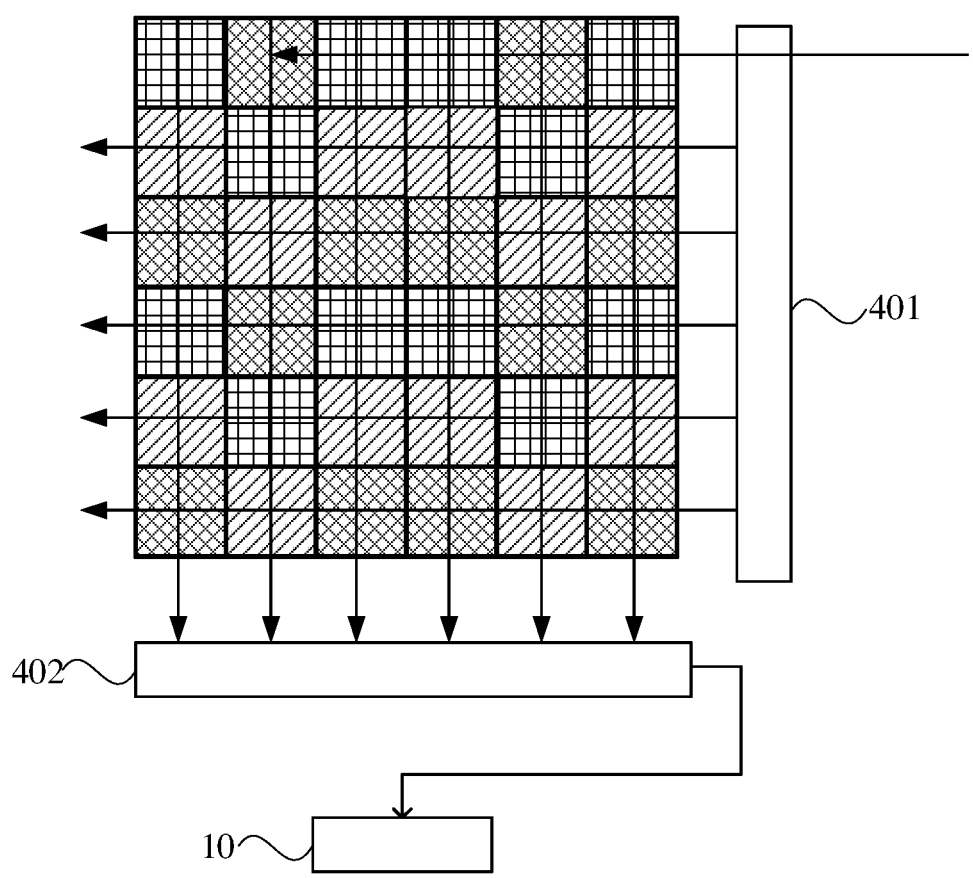

FIGS. 9-11 are schematic diagrams of connection schemes of a photoelectric detection unit according to some embodiments of the present disclosure. As shown in FIGS. 9-11, each detection region includes a plurality of detection sub-regions. FIG. 9 and FIG. 10 schematically show that each detection region includes three detection sub-regions, FIG. 11 schematically shows that each detection region includes twelve detection sub-regions. FIGS. 9-11 only show the connecting line of one kind of detection region (e.g., a green detection region as shown in FIG. 8). The number of the detection sub-regions in each detection region may be different from the embodiments described here. In the embodiment shown in FIG. 9, the detection sub-regions of the detection region are connected to the control unit 10 via a signal bus to decrease the number of connecting lines and simplify the circuit. In the embodiment shown in FIG. 10, the detection sub-region is connected to the control unit 10 via an independent signal line to increase the detecting accuracy and can be used for the photoelectric detection unit with fewer detection regions. In the embodiment shown in FIG. 11, the photoelectric detection unit includes a scan unit 401 and a pre-processing unit 402. The pre-processing unit 402 includes a preamplifier and an analog-to-digital converter. The detection sub-regions are connected to the control unit 10 via the pre-processing unit 402 in a manner to be scanned in sequence, which can be used in the display apparatus having a high intensity of photoelectric sensors to precisely detect the light-emitting characteristics of the display unit.

Figure 12:
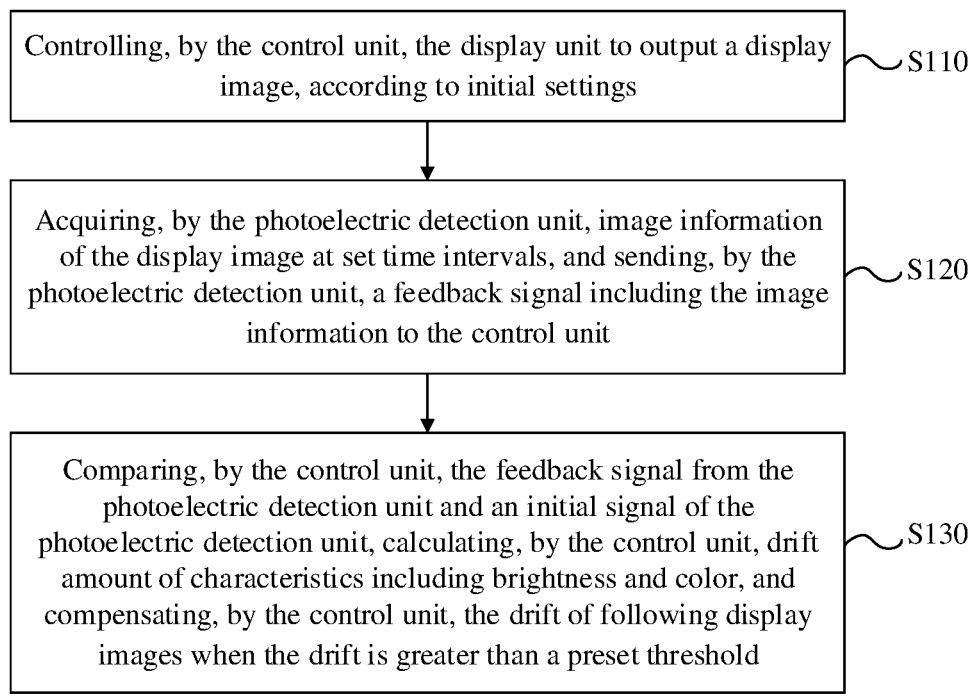
FIG. 12 is a flow chart of a driving method of a wearable display apparatus according to an embodiment of the present disclosure.

FIG. 12 is a flow chart of a driving method of a wearable display apparatus according to an embodiment of the present disclosure. The driving method can be used to drive any kind of wearable display apparatus described above and includes the following steps:

S110: controlling, by the control unit, the display unit to output a display image, according to initial settings;

wherein the control unit includes an image processing chip configured to control the display unit to output a display image according to a preset program, the display unit includes a silicon-based organic light-emitting display panel to satisfy the requirement of small volume of the wearable display apparatus;

S120: acquiring, by the photoelectric detection unit, image information of the display image at set time intervals, and sending, by the photoelectric detection unit, a feedback signal including the image information to the control unit;

wherein the preset time interval is set according to actual requirements of the wearable display apparatus, for example, one day, two days, or certain hours etc., the photoelectric detection unit transfers the light signal to electronic signal and sends the electronic signal to the control unit as a feedback signal;

S130: comparing, by the control unit, the feedback signal from the photoelectric detection unit and an initial signal of the photoelectric detection unit, calculating, by the control unit, a drift amount of characteristics including brightness and color, and compensating, by the control unit, for the drift for the display images to be displayed subsequently when the drift amount is greater than a preset threshold;

wherein the preset threshold is set according to actual requirements, for example, the brightness decay is greater than a preset percentage, a color coordinate deviation is greater than a preset value, etc.

In the display apparatus and the driving method of the present disclosure, the control unit is configured to control the display unit to output a display image. The photoelectric detection unit is configured to acquire image information of the display image at set time intervals, for example, every time past an hour, and feeds back to the control unit, the control unit is then configured to compare the feedback signal from the photoelectric detection unit and an initial signal of the photoelectric detection unit, and calculate drift amount of characteristics including brightness and color, and compensate for the drift when the drift amount is greater than a preset threshold, such that the displayed image perceived by the user can remain a quality like a new display apparatus, and the lifetime of the wearable display apparatus is increased.

In some embodiments, the control unit is configured to compensate for the drift of brightness and color by adjusting the driving current of the light-emitting unit.

As OLED is current driven, when the light-emitting elements are OLED, the light-emitting characteristics of the light-emitting element can be changed by adjusting the driving current. In some embodiments, the control unit 10 combines a signal component for compensation with the original image signal to be sent to the display unit 20, in a way such as simple addition and subtraction, or more complex non-linear modification. The combination way or the processing approach can be selected according to actual situation and requirement. Therefore, after the updated image electronic signal is input to the display unit 20, the subsequent display image output will be restored to the state before the brightness decay or color deviation. In another embodiment, when the light decay or color deviation is compensated, appropriate overcompensation can be used to decrease the frequency of compensation.

In some embodiments, the photoelectric detection unit includes a plurality of detection regions. When the drift of characteristics including brightness and color is compensated, the display image area close to a boundary between two adjacent detection regions is compensated by applying a smoothing algorithm of linear interpolation.

Some pixels are located at the boundary between adjacent detection regions or detection sub-regions. When two adjacent detection regions or detection sub-regions are compensated differently, the boundary between the two adjacent detection regions or detection sub-regions may display abnormally. Therefore, the compensation to the pixels at the boundary can include a smoothing algorithm to prevent abnormal display.

Figure 13:
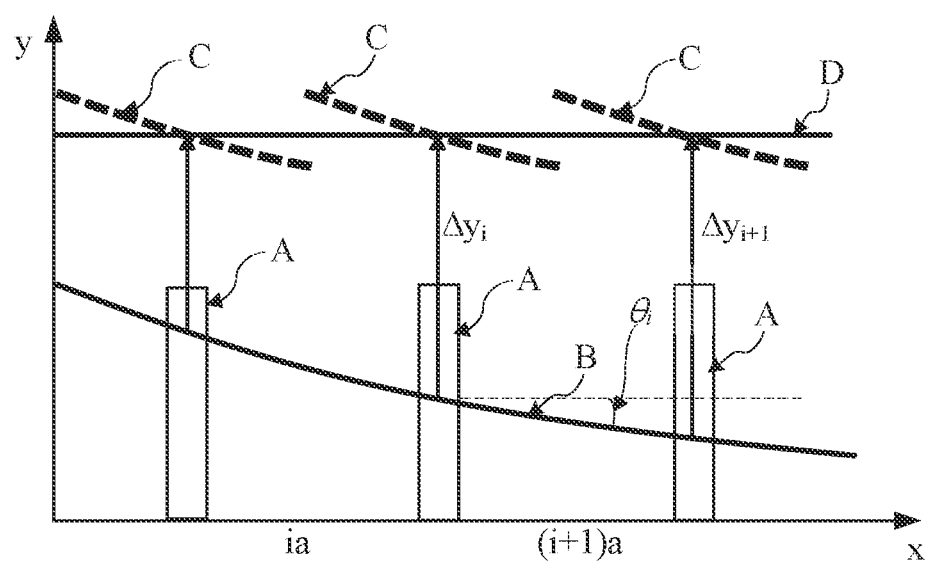
FIG. 13 is a schematic diagram illustrating a compensating method applying a smoothing algorithm according to an embodiment of the present disclosure.

FIG. 13 is a schematic diagram illustrating a compensating method applying a smoothing algorithm according to an embodiment of the present disclosure. In FIG. 13, x-axis represents space distance and the space between the detection sub-region is a; and y-axis represents a kind of image characteristic, for example, image brightness, bar A represents a detection region of the photoelectric detection unit. For a plurality of pixels, curve B represents the brightness changing curve along the x-axis after the brightness is decayed, curve C represents the brightness changing curve after compensation. For a plurality of separated detection regions, the brightness at the boundary between adjacent areas will change suddenly. Therefore, the pixels at the boundary are compensated by applying a smoothing algorithm. One smoothing algorithm is described as follows. The change gradient of i-th detection sub-region $\tan \theta_i$ is calculated by the following equation:

$$\tan\theta_i = \frac{\Delta y_{i+1} - \Delta y}{a}$$

and the continuous compensation function is as follows:

$$Y(x) = \Delta y_i + \tan \theta_i \ [(i+0.5)a - x], ia \leq x \leq (i+1)a$$

The curve D after the smoothing algorithm is acquired to realize uniform display images. In other embodiments, the smoothing algorithm can also include non-linear interpolation or extrapolation. FIG. 13 shows the compensation for brightness, similar compensation method can also be used to compensate for other characteristics, for example, color.

The above is a detailed description of the present disclosure in connection with the specific preferred embodiments, and the specific embodiments of the present disclosure are not limited to the description. Modifications and substitutions can be made without departing from the spirit and scope of the present disclosure.

What is claimed is:

1. A wearable display apparatus comprising:
a control unit;
a display unit comprising a plurality of light-emitting elements and electrically connected to the control unit;
a light transmission unit; and
a photoelectric detection unit electrically connected to the control unit;
wherein the control unit is configured to control the display unit to output a display image;
wherein the light transmission unit comprises a reflector or a diffractive coupler, and wherein the reflector or the diffractive coupler is configured to transmit a first part of light of the display image to human eyes, and transmit a second part of the light of the display image to the photoelectric detection unit;
wherein the photoelectric detection unit is configured to send a feedback signal to the control unit after detecting the second part of the light; and
wherein the control unit is configured to compensate for drift of characteristics including brightness and color according to the feedback signal from the photoelectric detection unit.

2. The wearable display apparatus according to claim 1, wherein the light transmission unit further comprises:
a transmission channel;
wherein the reflector comprises a first reflector and a second reflector,
wherein the first reflector is configured to reflect the display image to the transmission channel; and
wherein the second reflector has a first and a second side, and the second side is configured to receive the light of display image reflected from the first reflector and reflect the first part of the light of the display image to the human eyes, and transmit the second part of the light of the display image to the photoelectric detection unit; wherein the photoelectric detection unit is located at the first side of the second reflector and the first side is opposite to the second side of second reflector, and a reflectivity of the second reflector ranges from 50% to 99%.

3. The wearable display apparatus according to claim 2, further comprising a transparent dielectric layer disposed on the first side of the second reflector, wherein the photoelectric detection unit is disposed on the transparent dielectric layer and stacked on the second reflector via the transparent dielectric layer, and a refractive index of the transparent dielectric layer is between that of the second reflector and that of the photoelectric detection unit.

4. The wearable display apparatus according to claim 1, wherein the light transmission unit further comprises:
an optical waveguide configured to transmit optical images;
wherein the diffractive coupler comprises a diffractive input-coupler and a diffractive output-coupler,
wherein the diffractive input-coupler is configured to couple the display image to the optical waveguide; and
wherein the diffractive output-coupler is configured to output the first part of light of the display image to the human eyes, and output the second part of the light of the display image to the photoelectric detection unit, wherein the diffractive output-coupler has a second side facing the human eyes and a first side opposite to the second side;
wherein the photoelectric detection unit is located at the first side of the diffractive output-coupler.

5. The wearable display apparatus according to claim 4, further comprising a transparent dielectric layer disposed on the first side of the diffractive output-coupler, wherein the photoelectric detection unit is disposed on the transparent dielectric layer and stacked on of the diffractive output-coupler via the transparent dielectric layer, and a refractive index of the transparent dielectric layer is between a refractive index of the diffractive output-coupler and a refractive index of the photoelectric detection unit.

6. The wearable display apparatus according to claim 4, wherein the diffractive input-coupler comprises surface relief gratings or volume holographic gratings, and the diffractive output-coupler comprises surface relief gratings or volume holographic gratings.

7. The wearable display apparatus according to claim 1, wherein the display unit comprises a silicon-based OLED display panel.

8. The wearable display apparatus according to claim 1, wherein the photoelectric detection unit comprises at least one black-white photoelectric sensor configured to detect light flux, and at least one multispectral photoelectric sensor or color image sensor configured to sense different color spectrum.

9. The wearable display apparatus according to claim 8, wherein the photoelectric detection unit comprises a plurality of detection regions, the detection regions of a same color are electrically connected to the control unit via a signal bus, or each detection region is electrically connected to the control unit via an independent signal line, or all detection regions are electrically connected to the control unit after being scanned in sequence and passing through a first pre-processing unit.

10. A driving method of a wearable display apparatus, the wearable display apparatus comprising a control unit, a display unit comprising a plurality of light-emitting elements and electrically connected to the control unit, a light transmission unit comprising a reflector or a diffractive coupler, wherein the reflector or the diffractive coupler is configured to transmit a first part of light of a display image to human eyes, and transmit a second part of the light of the display image to a photoelectric detection unit, and the photoelectric detection unit electrically connected to the control unit, the driving method comprises:

controlling, by the control unit, the display unit to output a display image according to initial settings;

acquiring, by the photoelectric detection unit, image information of the display image at set time intervals, and sending, by the photoelectric detection unit, a feedback signal comprising the image information to the control unit; and comparing, by the control unit, the feedback signal from the photoelectric detection unit and an initial signal of the photoelectric detection unit, calculating, by the control unit, a drift amount of characteristics including brightness and color, and compensating, by the control unit, for a drift of subsequent display images when the drift amount is greater than a preset threshold.

11. The driving method according to claim 10, wherein the photoelectric detection unit comprises a plurality of detection regions, the driving method further comprising:

compensating display image areas close to a boundary between two adjacent detection regions by applying a smoothing algorithm of linear interpolation when the drift of characteristics including brightness and color is compensated.

* * * * *